United States Patent [19]

Rutledge

[11] Patent Number: 4,811,112
[45] Date of Patent: Mar. 7, 1989

[54] VECTOR DPCM IMAGE CODING METHOD AND APPARATUS

[75] Inventor: Charles W. Rutledge, Somerset, N.J.

[73] Assignee: American Telephone and Telegraph Company, AT&T Bell Laboratories, Murray Hill, N.J.

[21] Appl. No.: 77,341

[22] Filed: Jul. 24, 1987

[51] Int. Cl.$^4$ .............................................. H04N 7/12
[52] U.S. Cl. ............................... 358/260; 358/261.02; 341/50
[58] Field of Search .................. 358/260, 261, 133; 340/347 DD; 375/122; 382/56

[56] References Cited

U.S. PATENT DOCUMENTS

| | | | |
|---|---|---|---|
| 3,980,809 | 9/1976 | Cook | 358/260 |
| 4,513,426 | 4/1985 | Jayant | 375/26 |
| 4,563,671 | 1/1986 | Lim et al. | 358/261 |

*Primary Examiner*—Edward L. Coles, Sr.
*Attorney, Agent, or Firm*—Jerry W. Herndon

[57] ABSTRACT

A method and apparatus for encoding a graphics image by treating the image as plurality of cells. Each cell comprises a plurality of pixels. The states of the pixels of a cell are predicted using pixel states of priorly processed adjacent cells. A differential cell containing differential pixel states is created by comparing the predicted pixel states to the corresponding actual pixel states of the cell. The differential cell is compared with a plurality of predefined library differential cells to locate a closest match and a vector code identifying the located closest matching library cell is transmitted to a decoder. The vector code is used at the decoder to reconstruct an approximation of the image cell using a library of differential cells identical to the library of differential cells used to generate the vector code at the encoder. A variation of the invention dynamically adjusts the size of a cell to compensate for excessive prediction error.

17 Claims, 5 Drawing Sheets

VECTOR DPCM IMAGE CODING METHOD AND APPARATUS

BACKGROUND OF THE INVENTION

1. Field of the Invention

The invention relates to the encoding, transmission and decoding of graphical image data. In particular, it relates to a novel method and apparatus for combining the techniques of differential pulse code modulation (DPCM) and vector quantization, resulting in a significant improvement in performance.

2. Technical Background

The conventional method of encoding graphical image data by differential pulse code modulation (DPCM) takes advantage of the fact that, in general, the states of adjacent pixels of a graphic image are highly correlated. The technique uses previously processed pixels of the image to predict the state of a present pixel and then transmits the value of the difference between the state of the actual pixel and the predicted state of the pixel. Because the differential values are generally much smaller than the original pixel values, these differential values may be transmitted with fewer bits than the original values. U.S. Pat. No. 4,513,426, issued Apr. 23, 1985, to N. S. Jayant, is illustrative of this encoding technique.

Vector quantization encoding is an encoding technique in which a block of pixel values representing a portion, or cell, of an original image is approximated by comparing the cell with a library of predefined cells and selecting one of the library cells that forms a closest match. A vector code identifies the selected library cell. The vector, rather than the original pixel values or the cell, is transmitted to a decoder. An example of this technique is disclosed in U.S. Pat. No. 3,980,809 to W. C. Cook.

Generally, vector encoding, as described above, offers an improved compression of data over the DPCM technique. However, the improvement in compression is often attended by other problems, such as blocky reconstructed images and a requirement for image dependent library cells.

The above described techniques are applied successfully in many areas. However, because of the importance of data transmission, there is a continuing need for further improvements.

SUMMARY OF THE INVENTION

An advance is achieved in the art in a method and apparatus for encoding a graphics image by treating the image as plurality of cells. Each cell comprises a plurality of pixels with the state of each pixel defining a visual attribute of a point in the graphics image. The states of the pixels forming an image cell are predicted using the actual pixel states of at least one priorly encoded cell adjacent to the cell being predicted or by using assumed initial pixel states if there is no priorly encoded adjacent cell. A differential cell containing differential pixel states is created by comparing the predicted pixel states to the corresponding actual pixel states of the cell. The differential cell is then compared with a plurality of predefined library differential cells to locate a closest match. A vector code identifying the located closest matching library cell is transmitted to a decoder.

The vector code is used at the decoder to reconstruct an approximation of the image cell using a library of differential cells identical to the library of differential cells used to generate the vector code at the encoder. This is accomplished by predicting the states of the pixels in the image cell corresponding to the received vector code, using the pixel states of at least one priorly reconstructed cell or using initial pixel states if there are no priorly encoded cells. The received vector code identifies a quantized differential cell in the decoder library, identical to the cell selected from the library of differential cells in the encoder. The states of the quantized differential cell are accessed from the decoder library and are added to the corresponding states of the predicted image cell to form the reconstructed image cell.

In a preferred embodiment, each cell comprises an M by N matrix of pixels. The predicting of the states of a cell at the encoder and decoder involves computing the predicted state of each pixel of an image cell being reconstructed. This is accomplished by predicting each pixel in a cell individually in a raster scan format. The information upon which the predictions are based is found in the states of the border pixels of the reconstructed cells found above and to the left of the cell being processed. Each pixel is predicted as the average of the states of the pixels above and to the left of the pixel being predicted. The first pixel to be predicted is in the upper left corner of a cell and uses the states of two pixels found in the reconstructed cells above and to its left. The predictions move from left to right across the first row of the cell, each prediction using the states of a reconstructed pixel found above it and a predicted pixel found to its left. After the row has been completely predicted, the row below it is predicted in a similar fashion. The first pixel in this row is predicted using the states of a reconstructed pixel to its left and a predicted pixel above it. The remainder of the row is predicted using the average of the predicted states of the pixels above and to the left of the pixel being predicted. The remaining rows of the cell are then predicted in the same manner.

Because of cell content, some cells are more difficult to predict than others. A variation of the invention dynamically adjusts the size of a cell to compensate for excessive prediction error. The number of pixel states contained in a cell are reduced in accordance with the level of difference between the predicted pixel states of a cell and the actual pixel states. After a cell is predicted and a differential prediction cell is created, the differential cell is examined for a predefined error threshold between the states of the predicted cell and the states of the original image cell. If the threshold is exceeded, the cell size is partitioned into a plurality of subdifferential cells and the subcells are processed.

In the preferred embodiment, two error thresholds are used, a first lower threshold of differential cell states in which each state exceeds a high first value, and a second higher threshold of differential cell states in which each state exceeds a second low value.

DETAILED DESCRIPTION

Figure 1:
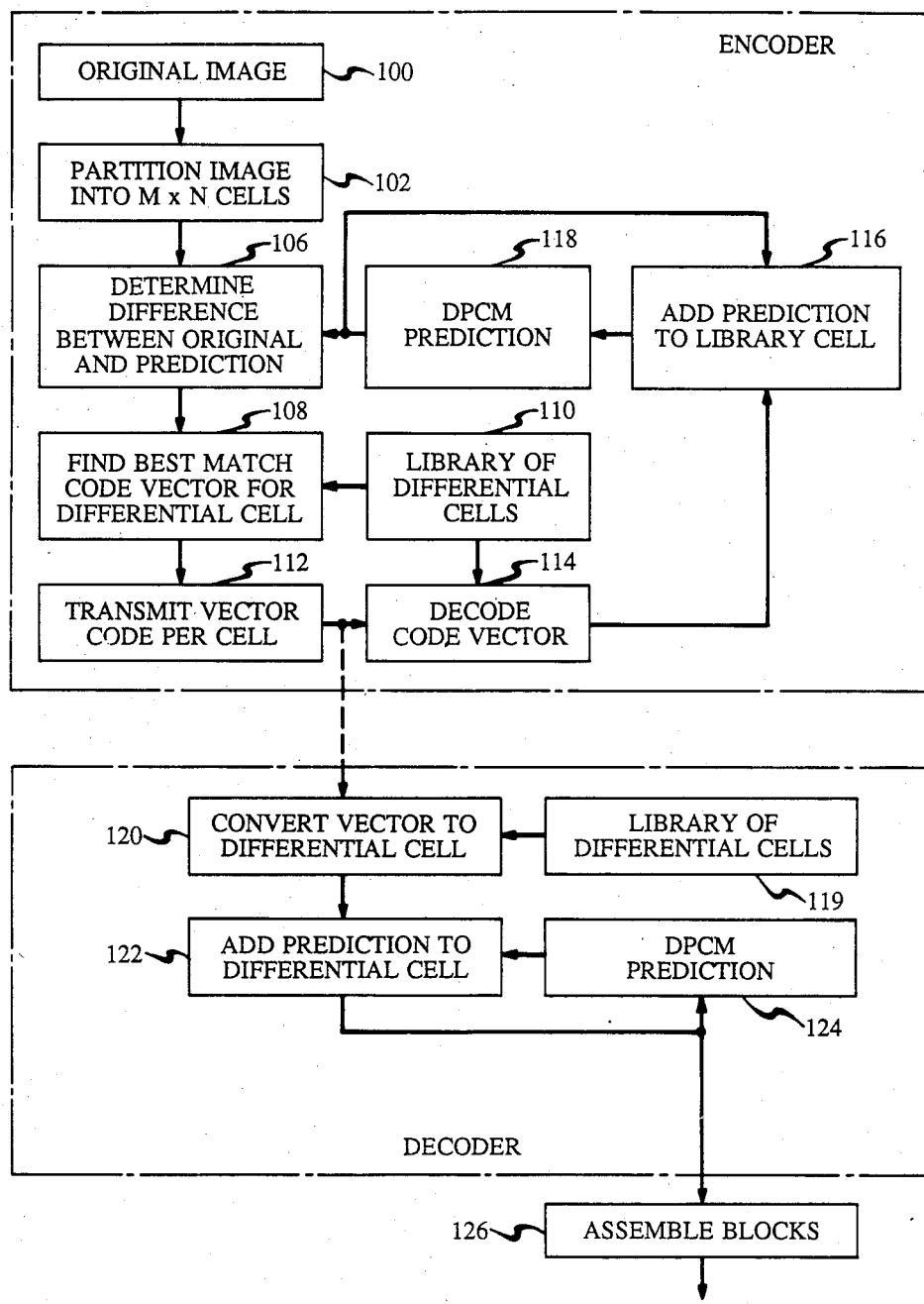
FIG. 1 is a flowgraph depicting the steps performed in encoding and decoding an image according to the invention.

A conceptual block diagram of a decoding-encoding method in accordance with the invention is shown in FIG. 1. An original image, represented at block 100, is viewed as being composed of a plurality of cells, each consisting of an M by N matrix of pixels. This is conceptually illustrated at block 102. The image is processed cell by cell as opposed to pixel by pixel as is conventionally done in DPCM encoding. The pixel states of a cell are passed from block 102 to block 106. Another input to block 106 comes from the DPCM prediction block 118. This input receives the predicted pixel states of the cell presently being processed from block 102. These predicted states are generated from priorly processed cells, as will become apparent. The difference between the predicted cell states from 118 and the original cell states from 102 is calculated at block 106. At block 108, the resulting differential cell is compared for a best least square fit to each of a plurality of predefined differential cells maintained in an encoder library 110. Each library cell is identified by a unique code. The original cell is vector quantized by assigning to it the code of the best fitting library cell. At block 112, this vector code is transmitted to a decoder. In addition, the vector code is decoded at the encoder at block 114 by using it to reaccess the cell library. The original prediction is added to the library cell at block 116 to reconstruct the original cell. A reconstructed cell is passed to block 118 for predicting the states of the future cell to be processed.

At the decoder, block 120 uses a received vector code to access its library 119 of predefined differential cells. This library is, of course, identical to the library 110 at the encoder. The library cell is passed to block 122, which is also receiving present predicted cell states from a DPCM predictor 124 in a manner similar to that discussed above with respect to the encoder. Block 122 adds the differential pixel states from the library cell to the predicted states to construct a quantized version of the original cell. This result is passed both to the DPCM predictor 124 for the future prediction and to block 126 where the cells are assembled to reconstruct the entire original image.

Figure 2:
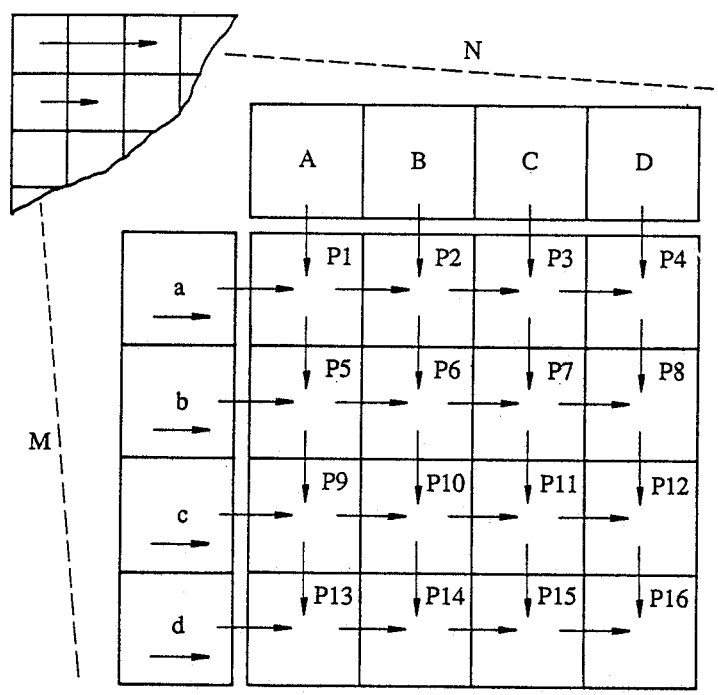
FIG. 2 shows an illustrative image cell consisting of pixels P1 through P16 and the method of predicting the values of these pixels using the values of adjacent perimeter pixels A-D and a-d of previously processed cells.

The method of predicting cell states in the above discussion is illustrated in FIG. 2. Each prediction is begun using the perimeter pixels of the cells above it and to the left of it. Since the image is processed from left to right and from top to bottom in this illustrative embodiment, these cells have been previously processed. Each pixel of a cell is predicted by using the average of the pixel above and to the left of the pixel being predicted. Thus, by way of example, pixel P1 in FIG. 2 is predicted using the states of pixels a and A, where a and A are reconstructed pixel states of previously processed cells. Pixel P2 is predicted using the states of the predicted value P1, and the previous reconstructed pixel B, P3 is predicted using the states of P2 and C, this process continuing to the end of the row. The next row is then predicted, again starting at the left predicting P5 using the previous pixel state b and the predicted value P1. The remaining pixels in this row are then predicted using the predicted values of the pixels above and to their left. Prediction continues in a similar manner until the final pixel in the cell P16 is predicted using the predicted values P15 and P12. The result is that the entire cell is predicted using the states of the perimeter pixels of the above and left previously processed cells.

Figure 3:
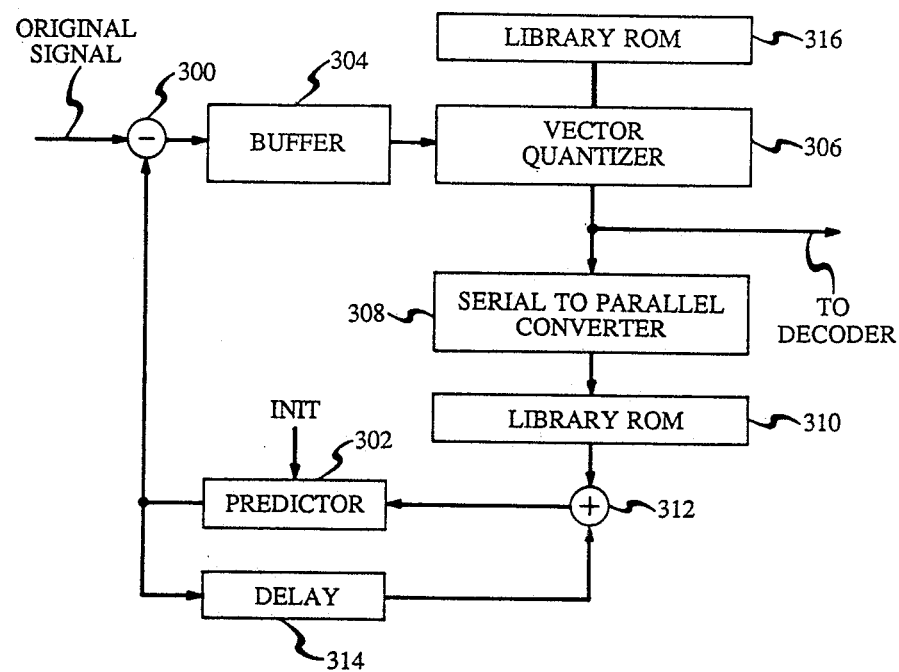
FIG. 3 shows a block diagram of one encoder according to the invention.
Figure 4:
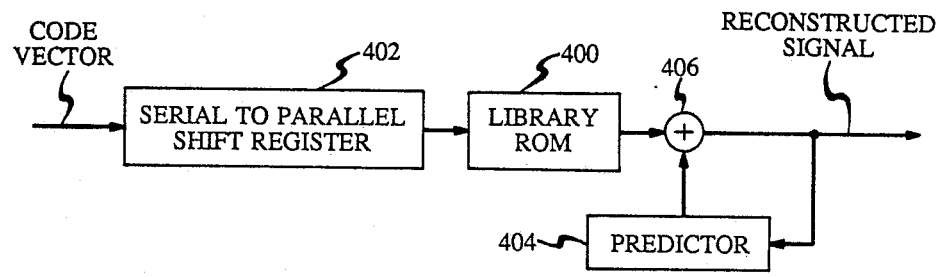
FIG. 4 shows a block diagram of one decoder according to the invention.

An encoder for monochrome operation is shown in FIG. 3 and a corresponding decoder is shown in FIG. 4. In FIG. 3, a subtracting gate 300 subtracts the states of original pixels of a cell from the predicted pixel states generated by a predictor 302. The resulting differential cell is temporarily stored in a buffer 304 for input to a vector quantizing circuit 306. The output of the vector quantizer is the vector code described above which is transmitted to a decoder, such as the one shown in FIG. 4. The output of the vector quantizer 306 is also passed to a ROM 310 which contains the library of predefined differential cells. The output of the ROM 310 is summed by a summing gate 312 with the previous output of predictor 302 to form reconstructed states of the pixels of the presently coded cell. The previous predicted states are obtained by virtue of a delay pixel 314. The resulting reconstructed states are inputted to predictor 302 to allow prediction of the cells that have yet to be predicted.

In this illustrative embodiment, the vector quantizer 306 contains nine separate computation modules (not shown) eight of which are used to determine in parallel the squared difference between eight different library cells and an input differential cell formed at subtractor 300. On the first computation pass, the square of the difference is determined between the input differential cell and eight different library cells. The ninth module will then take these eight squared difference states, compare them and store the value of the smallest squared difference along with the library code number that produced it. The library code number consists of a concatenation of the module identification number that calculated the least square difference and the number of the computational pass. This process continues by performing another pass using the same input differential cell and eight new library cells. The ninth module then again determines the least square difference and corresponding vector code for the new set of eight library cells and compares it to the least square difference from earlier passes to determine the overall least square difference and corresponding library code number. This process continues until the differential cell has been compared to all the library cells. The vector code and the value of the least square error are outputted from the vector quantizer 306 in serial format.

Although the above discussion of the vector quantizer 306 is described in terms of multiple passes in each of which eight library cells are processed, a different embodiment in which a number of vector quantizers 306 are placed in parallel, and all library cells are processed in one pass could be easily implemented. There are also various search algorithms that could be implemented to perform a library selection function similar to that of the vector quantizer 306.

The decoder in FIG. 4 consists of many of the same elements found in the encoder of FIG. 3 and illustratively consists of a library ROM 400, a serial to parallel shift register 402, a predictor 404 and an adding gate 406. ROM 400 contains the identical library differential cells as ROM 316 of the encoder. The vector codes from the encoder are received and entered into shift register 402. The output of shift register 402 is used to select a differential cell from the library ROM 400. The differential states of the selected library cell are added to the present predicted states from predictor 404. This reconstructs the original cell. The reconstructed states are also fed back into the predictor 404, as in the encoder, to predict the next and future cells.

Figure 5:
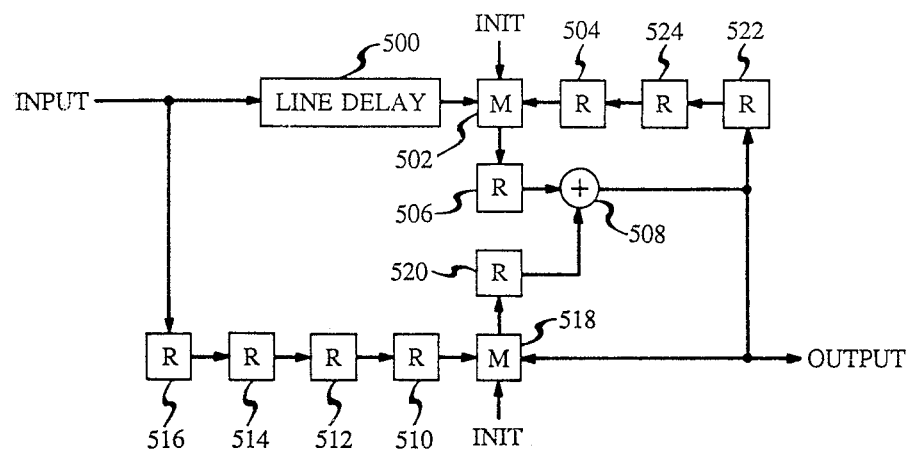
FIG. 5 shows a block diagram of a predictor circuit used in the encoder and decoder of FIGS. 3 and 4.

A predictor, such as used in FIGS. 3 and 4, is shown in FIG. 5. This illustrative predictor is designed for operation on cells of size 4 pixels×4 pixels, each pixel being an 8-bit value. The operation of the predictor was discussed briefly with respect to FIG. 2. For each pixel in a cell, the predictor averages the state of the pixel above and to the left of it as the cell is processed in a raster format. For this purpose, a number of registers R and two multiplexers are used. The top row of elements of FIG. 5 stores the top adjacent pixel states of priorly processed cells. Specifically, a delay circuit 500 is used to store the states of the pixels immediately above the next row of cells to be predicted. Thus, circuit 500 inserts a delay of exactly one raster line. Multiplexer 502 selects four bytes from the output of delay circuit 500 representing the states of pixels A, B, C and D, for example, in FIG. 2. Multiplexer 502 then selects an output byte from register 504. The selected bytes are passed through register 506 to one input of an adder 508. Thus, the registers 504, 506, 522 and 524 provide a one-cell-row delay within a cell, to store the states of each predicted pixel to be used in predicting the following row of pixels.

The bottom row of elements of FIG. 5 stores the pixel states left adjacent to the pixels presently being predicted. Using an analogy similar to that above, registers 510, 512, 514 and 516 contain at an appropriate time the byte states of pixels a, b, c and d, respectively, in FIG. 2. Multiplexer 518 is programmed to select the value of the output of register 510, then select three consecutive outputs from the adder 508. The selections are passed through register 520 to a second input of adder 508. The most significant eight bits of adder 508 are outputted as the present pixel prediction. The least significant bit from adder 508 is discarded to provide an average of the two states added. The output of adder 508 is also routed directly to multiplexer 518 and through registers 522, 524 and 504 to multiplexer 502 at appropriate times to be used in future predictions within the cell.

Pixels on the top or left edge of an image have no adjacent top and left pixels associated with them. Thus, the predictor is provided with initial states for these image boundary pixels. This is the purpose of the INIT inputs to the multiplexers 502 and 518. A standard initial byte state such as 128 may be used.

Figure 6:
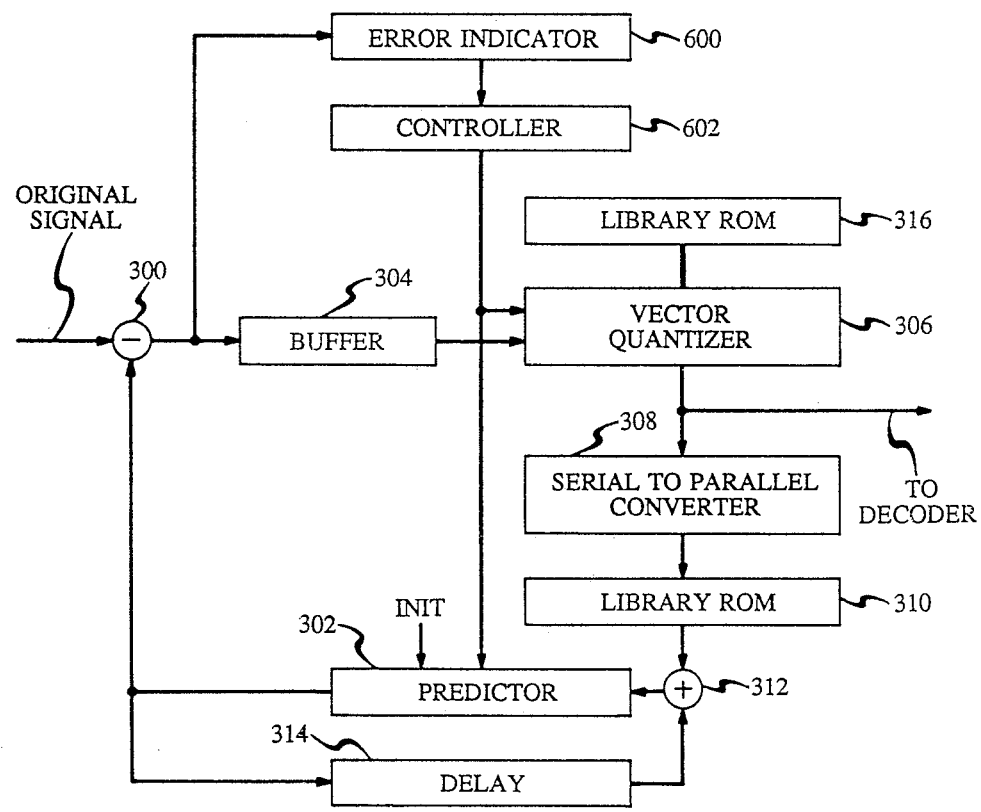
FIG. 6 shows a block diagram of one encoder that adaptively varies the size of a cell according to the degree of error that is detected in the encoding/decoding process.

FIG. 6 shows an illustrative encoder for an embodiment of the invention in which the size of a cell is dynamically varied to adapt to conditions of excessive error detected in the production process. In effect, more information is transmitted where there is more detail in the original image. The adaptive encoder of FIG. 6 is similar to that of the nonadaptive encoder of FIG. 3, with the addition of a cell error indicator circuit 600 and a controller 602. Error indicator 600 examines the differential cells which are outputted from subtracting gate 300 enroute to buffer 304. Error indicator 600 determines if either a low error threshold or a high error threshold has been violated and, if so, sends a signal to a controller 602 to change the size of the cells. Controller 602, in turn, sends appropriate signals to the vector quantizer 306, and predictor 302 and relevant pixel counters.

This illustrative adaptive embodiment initially assumes that the size of cells are 8 pixels by 8 pixels. If an excessive number of errors is found in a differential predicted cell, as manifested by a violation of either the low or high error threshold, the 8×8 cell is illustratively divided into four cells of size 4 pixels×4 pixels. If excessive error still persists, the 4×4 cell is further illustratively divided into four cells of size 2 pixels×2 pixels. After the four 2×2 cells are processed, the encoder returns to processing the remaining 4×4 cells. Similarly, after completion of the four 4×4 cells the raster processing of 8×8 cells continues. Thus, the adaptive process begins afresh with each new 8×8 cell.

The predictors in the encoder and decoder for the adaptive embodiment retain all the information for an 8×8 cell until the next 8×8 cell arrives. This is done even when an 8×8 cell is being processed as 4×4 or 2×2 cells. In this way, the subdivision of an 8×8 cell into smaller sized cells can be accomplished on the fly. In other words, if an 8×8 cell is rejected by error indicator 600 and a predictor is told to process the array as a series of 4×4 cells, the data necessary to accomplish this still resides in the predictor, allowing new predictions to be outputted from the predictor based on the new cell size. And if one of these 4×4 cells exhibits excessive error leading to a division of it to a series of 2×2 cells, the same data still resides in the predictor to output new predictions based on the 2×2 cell size. This will become clearer below in connection with a detailed discussion of a predictor for the adaptive embodiment.

Figure 7:
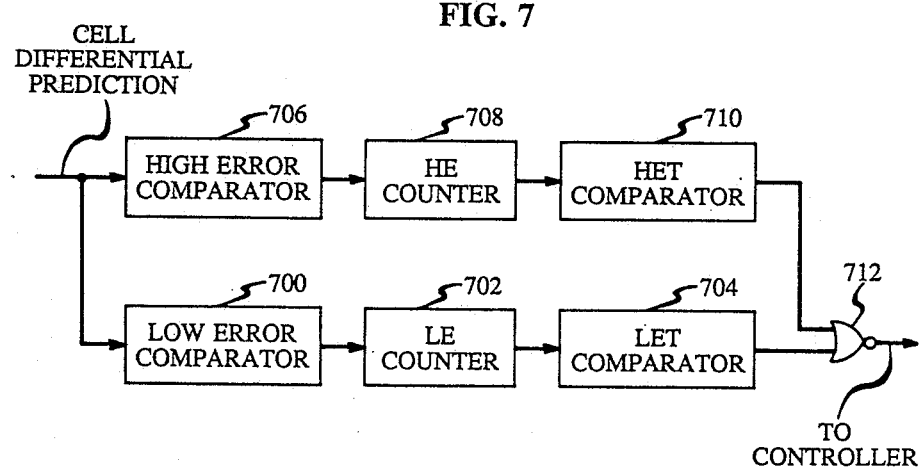
FIG. 7 shows an illustrative cell error indicator circuit that is used to determine the amount of error in the adaptive encoder of FIG. 6.

A block diagram of an illustrative error indicator circuit 600 is shown in FIG. 7. The decision by error indicator 600 to reduce a cell size is determined by two conditions. The first condition is the detection of a small number of pixels of a cell having a large predicted error. This is the function of the low error comparator 700, LE (low error) counter 702 and the low error threshold (LET) comparator 704. Comparator 700 emits a count signal to the LE counter 702 for each differential pixel prediction in a differential cell that exceeds a predetermined amount. The number of such signals is counted by LE counter 702. The output of counter 702 is compared by comparator 704 to a predetermined low error threshold. High error comparator 706, high error (HE) counter 708 and high error threshold (HET) comparator 710 function in a similar manner to detect an excessive number of differential pixel predictions of low error. If either threshold condition is violated, NOR gate 712 sends a signal to controller 602 to reduce the size of the cell. By way of example, for cells of initial size 8×8, the low and high error thresholds are 4 and 8, respectively, and the pixel limits are 32 and 8, respectively. This means that if the predicted difference of more than 32 pixels is greater than the state 4 or the predicted difference of more than 8 pixels is greater than the state 8, the 8×8 cell is divided into four 4×4 cells. There are similar error levels and pixel limits for the 4×4 blocks. Therefore, in a similar manner, if the low or high threshold error levels and pixel limits are violated for one or more of the 4×4 cells, the 4×4 cells are subdivided into four 2×2 cells. The error levels and pixel limits may be varied from those discussed above to provide a compromise between bit rate and reconstructed image quality.

In the adaptive embodiment, a vector code having the state of 0 is transmitted in lieu of a library vector code to indicate that the predictions are satisfactory for an 8×8 cell reconstruction and that predefined library cells are not to be used. Thus, in the absence of an excessive error signal from error indicator 600, the vector code 0 is transmitted by vector quantizer 306. This indicates that the prediction that will be generated by the decoder will be sufficiently accurate such that the prediction generated at the decoder should be used without reference to library cells.

Library vector codes are transmitted to the decoder only if an 8×8 cell is subdivided into 4×4 or 2×2 cells. Because 4×4 cells describe less detail than 2×2 cells, only 63 codes are used in the preferred embodiment to identify 4×4 cells. Thus, codes 1 through 63 represent 4×4 vector codes. Because of the high detail described by 2×2 cells, more vector codes are required to provide a reasonable representation of a wider variety of differential cells. Vector codes 64 to 255 are used for the 2×2 cells in the preferred embodiment.

Figure 8:
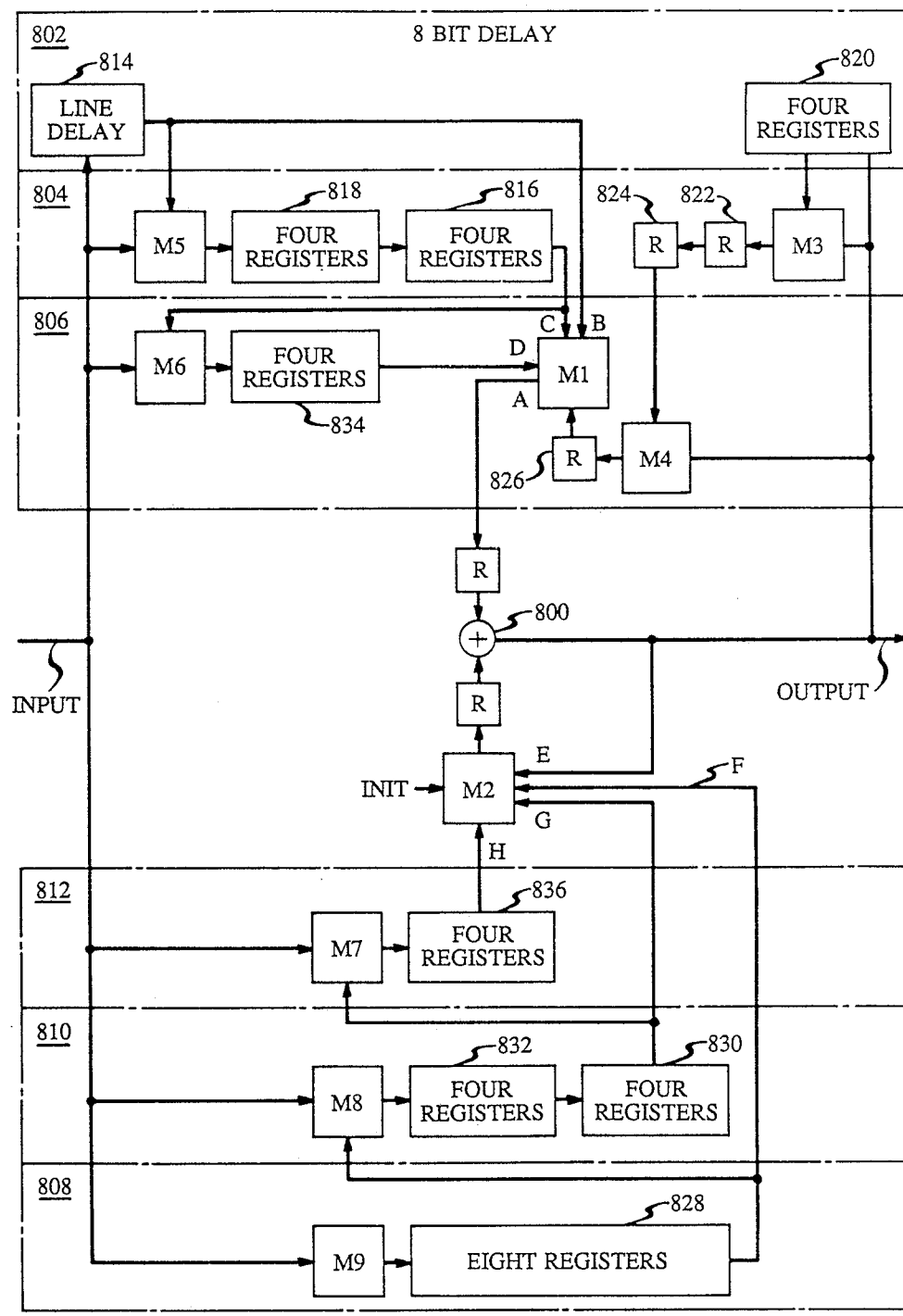
FIG. 8 shows a predictor circuit that is used in the adaptive embodiment.

A decoder for the adaptive embodiment is essentially identical to that of FIG. 3, with only the details of the predictor 302 requiring additional discussion. One illustrative predictor is shown in FIG. 8. The elements located above adder 800 are used to obtain the states of pixels top adjacent to the pixels presently being predicted. Specifically, the pixels in boxes 802, 804 and 806 are used when processing 8×8, 4×4 and 2×2 cells, respectively. Similarly, the elements below adder 800 in FIG. 8 are used to obtain the states of pixels left adjacent to the pixels presently being predicted. Specifically, the elements in boxes 808, 810 and 812 are used when processing 8×8, 4×4 and 2×2 cells, respectively.

As mentioned above, the predictor begins each new cell as an 8×8 matrix. When the first upper left pixel of an 8×8 cell is predicted, multiplexer M1 is accepting data on its input B and receives the state of the previously processed top adjacent pixel from the line delay 814. At the same time the eight pixel states above the cell being processed are read into two sets of four registers 816 and 818 via multiplexer M5. During the remainder of processing of the 8×8 cell, multiplexer M1 accepts data on its input A. This creates an 8-bit delay between an output prediction and a new cell input. The delay is via a set of four registers 820, multiplexer M3, two registers 822 and 824, multiplexer M4, and register 826. This delay always places in the predictor the predicted state of the pixel above the pixel being processed. To obtain the state of the pixel left adjacent to the pixel presently being processed, multiplexer M2 obtains data on its input F when the pixel being processed is at the left edge of the cell. Thus, M2 obtains data from registers 828 that contain the states of the rightmost pixels in the cell processed immediately before the present one. At the same time, these eight pixel states are inputted to two sets of four registers 830 and 832 via multiplexer M8. At all other times in the processing of an 8×8 cell, multiplexer M2 obtains data on its input E. This provides a one bit delay between a new input and the output prediction. Thus, the other pixel used to predict the present pixel is the pixel immediately to the left of the present one.

If the 8×8 cell size is rejected, then a signal from controller 602 sets multiplexers M1 and M2 to obtain data on their inputs C and G, respectively, where past pixel information is still available. Because the predictor is now processing 4×4 cells, it uses only the first four pixel states above and to the left of the present cell when processing the first of the four 4×4 cells. These pixel states are obtained from registers 816 and 818 which are loaded via multiplexer M6, and registers 830 and 832, which are loaded via multiplexer M7. Because there are now four 4×4 cells to be processed, intermediate pixel information needs to be stored to predict the remaining 4×4 cells within the original 8×8 cell. As the four perimeter pixel states of original top edge information are used and no longer needed, four registers 818 become free to store intermediate perimeter information. Thus, the bottom four pixels of the first of the four cells to be processed is stored in these registers via multiplexer M5. In a similar manner, the right perimeter pixels are stored in four registers 832 via multiplexer M8. Perimeter information on the bottom of the original 8×8 cell is stored in the line delay 814 that feeds multiplexer M1. Pixel states of the original 8×8 cell are stored in the eight registers 828.

A similar procedure occurs when a 4×4 cell is rejected and 2×2 cells are used. Multiplexers M1 and M2 are set to obtain data on their inputs D and H, respectively. Four registers 834 fed by multiplexer M6 initially contain the top border information and store the intermediate perimeter information found on the bottom row of the first and second of the 2×2 cells to be processed. Also, any pixel states that represent 4×4 cell top intermediate perimeter information is restored into the four registers 818 via multiplexer M5. Similarly, 8×8 cell top perimeter information is stored in the line delay 814. Four registers 836 and 832, fed by M7 and M8, respectively, are used in processing the left perimeter pixels for 2×2 cells in the same manner.

It is understood that the above described arrangements are merely illustrative of the principles of the invention and that other arrangements may be devised by those skilled in the art without departing from the spirit and scope of the invention as set forth in the claims.

What is claimed is:

1. A method of encoding a graphics image by treating the image as plurality of cells, with each cell comprising a plurality of pixels the state of each defining a visual attribute of a point in the graphics image, said method being characterized by the steps of predicting the states of the pixels forming an image cell using the actual pixel states of at least one priorly encoded cell adjacent to the cell being predicted or using assumed initial pixel states if there is no priorly encoded adjacent cell, creating a differential cell containing differential pixel states by comparing the predicted pixel states to the corresponding actual pixel states of the cell, comparing the differential cell with a plurality of predefined library differential cells to locate a closest match, and transmitting a vector code identifying the located closest matching library cell to a decoder.

2. The method of claim 1 further comprising the steps of reconstructing an approximation of the image cell at the decoder using the vector code and a library of differential cells identical to the library of differential cells used to generate the vector code.

3. The method of claim 2 wherein the step of reconstructing further comprises the steps of the states of the pixels of the image cell corresponding to the received vector code predicting from pixel states of at least one priorly reconstructed cell or from assumed initial pixel states if there is no priorly encoded adjacent cell, selecting from the decoder library a differential cell identical to the differential cell used to generate the vector code, and adding the differential cell to the predicted image cell.

4. The method of claim 1 or claim 3 wherein each cell comprises an M by N matrix of pixels and the step of predicting further comprises the steps of computing the predicted state of each pixel of an image cell presently being reconstructed, by successively predicting the states of the pixels of the cell beginning with a corner pixel, using for each prediction priorly processed pixels adjacent to the pixel presently being predicted.

5. A circuit for encoding a graphics image by treating the image as a plurality of image cells, with each image cell comprising a plurality of pixels, the state of each defining a visual attribute of a point in the graphics image, said circuit being characterized by means for predicting the states of the pixels forming an image cell using actual pixel states of at least one priorly encoded image cell adjacent to the image cell being predicted or using assumed initial pixel states if there is no priorly encoded adjacent cell, means for generating a differential cell containing, for each pixel of the image cell, a state equal to the difference between the image pixel state and the predicted state, means for comparing the differential cell with a plurality of predefined library differential cells to locate a closest match, and means for transmitting a vector code identifying the located closest matching library cell to a decoder.

6. The circuit of claim 5 further comprising means for reconstructing an approximation of the image cell at the decoder using the vector code and a library of differential cells identical to the library of differential cells used to generate the vector code.

7. The circuit of claim 6 wherein the means for reconstructing further comprises means for predicting from the pixel states of at least one priorly reconstructed cell the states of the pixels of the image cell corresponding to the vector code, means for selecting from the encoder library a differential cell identical to the differential cell used to generate the vector code, and means for adding the states of the pixels of the differential cell to the states of corresponding pixels of the predicted cell.

8. The circuit of claim 5 or claim 7 wherein each cell comprises an M by N matrix of pixels and the means for predicting further comprises means for computing the predicted state of each pixel of an image cell by successively predicting the states of the pixels of the cell beginning with a corner pixel, using for each prediction priorly processed pixels, adjacent to the pixel presently being predicted.

9. The circuit of claim 5 wherein the means for generating a differential cell further comprises means for subtracting the states of pixels of the image cell from the predicted states of the pixels received from the predicting means.

10. The circuit of claim 9 wherein the means for comparing further comprises means for storing the differential library cells, and a vector quantizing circuit for selecting the differential library cell most closely matching the predicted differential cell and for generating the vector code corresponding to the selected library cell.

11. The circuit of claim 10 further comprising means responsive to the vector code for regenerating the selected differential library cell on a pixel by pixel basis, means for synchronizing the output of the predicting means with the pixel by pixel regeneration of the differential library cell, and an adder for adding the pixel by pixel output of the regenerating means and the synchronizing means and for transmitting the results to the predicting means.

12. The circuit of claim 6 further comprising means for storing a decoder library of differential cells identical to the library of the encoding circuit, means for receiving the vector code from the encoding circuit and for accessing the decoder library storing means, and means responsive to the accessing of the decoder library cells for adding the pixel states outputted from the decoder library storing means to the output of the predicting means to reconstruct a cell.

13. The circuit of claim 12 further comprising means for transmitting the pixels of the reconstructed cell to the input of the predicting means.

14. The circuit of claim 5 further comprising means for dynamically reducing the number of pixel states contained in a cell in accordance with the level of difference between the predicted pixel states of a cell and the actual pixel states.

15. The circuit of claim 14 wherein the means for reducing further comprising means for detecting a predefined error threshold between the states of a predicted differential cell and the states of the image cell being predicted, and means responsive to the detecting means for partitioning the differential cell into a plurality of subdifferential cells for processing by said comparing means and by said predicting means.

16. The circuit of claim 15 wherein the means for detecting further comprises means for detecting a first threshold of differential cell states in which each state exceeds a first value, and means for detecting a second threshold of differential cell states in which each state exceeds a second value.

17. The circuit of claim 15 wherein the predicting means further comprises means for retaining all pixel states of a nonsubpartitioned cell until processing of the cell is complete, and means responsive to the detecting means for reprocessing a cell as a plurality of subcells using the retained cell pixel values.

* * * * *